REEL CLIP ASSEMBLY

Filed July 14, 1964

INVENTOR
James N. Cranwill
by Horton, Davis, Brewer + Brugman
Attys 3,287,777

REEL CLIP ASSEMBLY

James N. Cranwill, 2331 S. Whittier St., Springfield, Ill.

Filed July 14, 1964, Ser. No. 382,624
2 Claims. (Cl. 24—81)

This invention relates to a novel reel clip assembly for retaining a plurality of courses of a continuous tape in a tightly wound condition for storage thereof.

Continuous tapes bearing or adapted to bear intelligence in various forms are conventionally wound on reels. It is very important to maintain the plurality of courses of such tapes wound on a reel in a tightly wound condition during periods of non-use for many reasons. Tightly wound tapes such as motion picture film and magnetic tapes facilitate their most effective immediate use when placed in their operative environments. In the case of magnetic tapes loose courses of tape tend to rub with the attendant possibility of disturbing or altering the characteristics of an intelligence bearing surface thereof. Furthermore loosened or unwound courses of continuous tapes are a nuisance.

A number of means for retaining courses of tape in the desired tightly wound condition exist in the prior art. One such means is described and claimed in my prior patent, U.S. Patent No. 2,768,740 issued on October 30, 1956.

The reel clip assembly of this invention is a desirable improvement upon earlier devices. It may be characterized as comprising a reel clip cooperable with a reel upon which a continuous tape bearing or adapted to bear intelligence is to be wound and to be maintained in a tightly wound condition in which the reel clip comprises a pair of hingedly connected plates with a tape gripping means therebetween, the plates being clampable to each other for gripping the end portion of the continuous tape therebetween and means for releasably connecting the reel clip to the reel adjacent its periphery and for resisting movement of said reel clip along the periphery of said reel.

While it is particularly adapted for use with magnetic tapes it is also contemplated that it may be used with other tape-like media such as motion picture film and the like.

It is therefore an object of this invention to provide novel means for gripping the end of a continuous tape for maintaining the courses of tape on the reel in a tightly wound condition.

It is a further object of this invention to provide novel tape gripping means cooperable with a tape reel for retaining a plurality of courses of tape in a tightly wound condition in said reel in which a reel clip is releasably connectable to the reel and difficulty movable along the periphery of said reel and in which said reel clip includes means for receiving the outermost end portion of said tape and for releasably gripping said outermost end portion by clamping the end of said tape between clip device gripping means.

These and further objects and advantages of this invention will become apparent from the following description and drawings of a presently preferred illustrative embodiment. It is, of course, to be understood that the presentely preferred embodiment is illustrated and described to facilitate an appreciation and understanding of the invention in accordance with the patent laws and is not to be considered as limiting upon the invention:

Figures 1, 2, 3, 4:
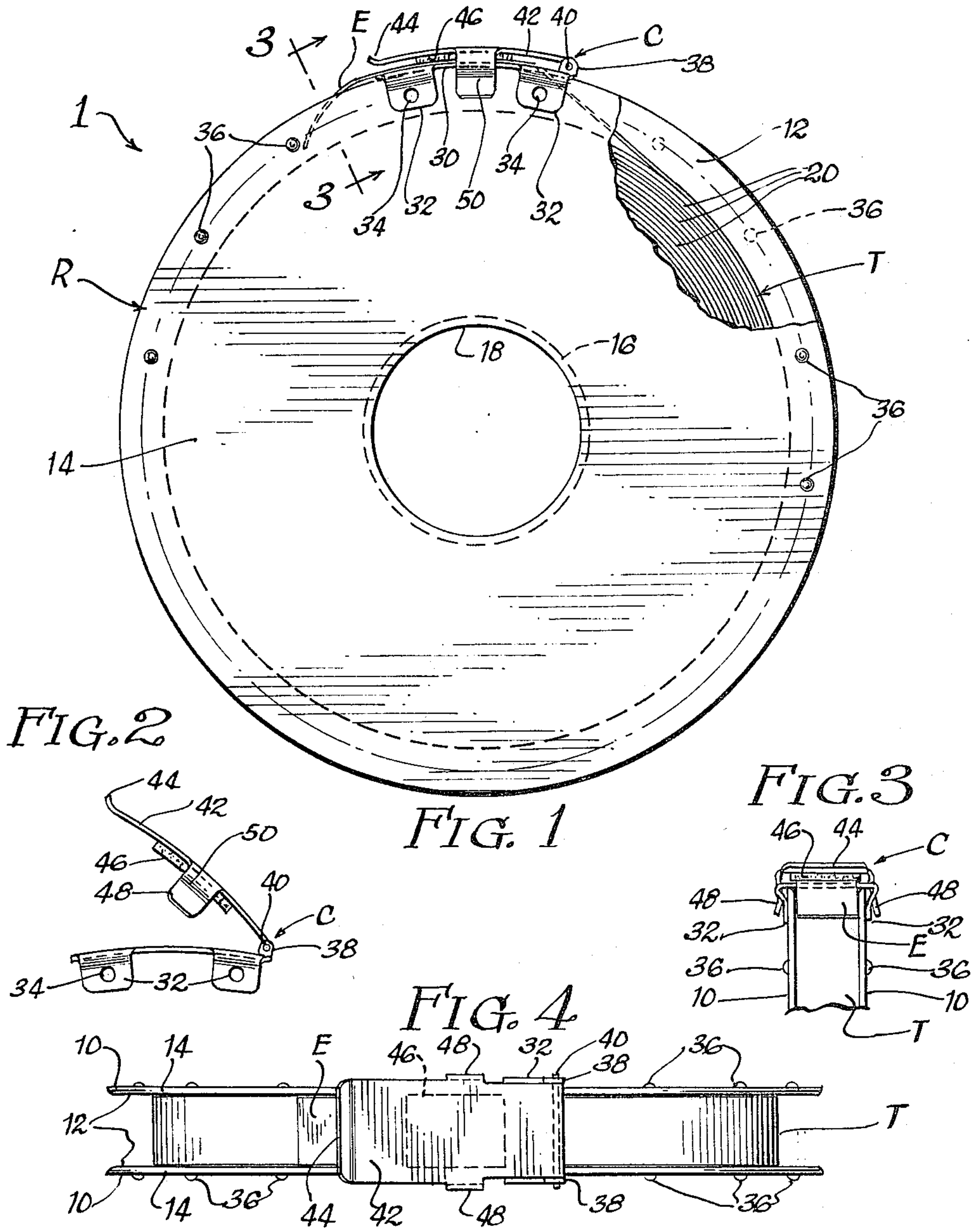
FIGURE 1 is a side elevation of a reel clip assembly of the invention.
FIG. 2 is a side elevational view of a reel clip of this invention in an open tape receiving position.
FIG. 3 is taken substantially along line 3—3 of FIG. 1 and is a front view of the reel clip of FIG. 1.
FIG. 4 is a plan view of the reel clip assembly of FIG. 1.
Figure 5:
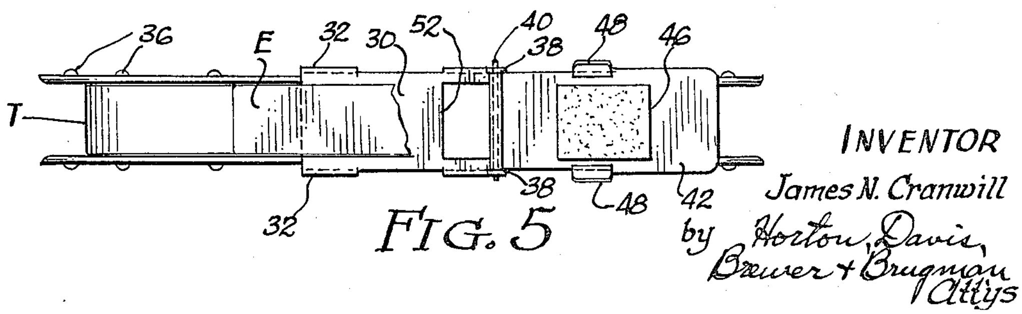
FIG. 5 is a partial plan view of FIG. 1 with one of the members of the reel clip in an open position.

First referring to FIG. 1, the reel clip assembly is there shown in its entirety as 1. The reel clip assembly includes a reel R and a reel clip C. The reel itself may be formed of a plastic material, although metal reels are also within the contemplation of this invention.

Reel R comprises a pair of spaced substantially circular side walls 10 each having inner faces 12 and outer faces 14. Side walls 10 are joined in their center regions by a hub 16 which defines a suitable spindle opening 18 in which the spindle of a device with which the tape T is to be used is receivable. Tape T which may be a continuous magnetic tape or other tape-like materials, such as motion picture film and the like, adapted to bear or already bearing intelligence, comprises a plurality of courses 20 intended to be maintained, in accordance with this invention, in a tightly wound condition for immediate use with the spindle of a suitable device. It is the end portion E of the tape T that the reel clip C of this invention is adapted to grip to maintain the courses 20 of tape T in a tightly wound condition.

The reel clip C includes an elongated main plate 30 arcuate in side elevational view and in longitudinal cross section. Its curvature is substantially the same as the curvature of the periphery of the reel with which it is to be used and its width is substantialy equal to the width of the reel between the outer faces 14 of side walls 10. At each longitudinal end of the main plate 30 and at each side thereof, downwardly extending spaced ears 32 are provided. These ears are adapted to grip the outside faces of the reel side wall between laterally spaced pairs thereof to facilitate clamping the clip to the reel.

Each ear 32 defines an opening 34 of a size proportioned to cooperate with dimples 36 on outer side wall faces 14. Dimples 36 are spaced around and somewhat inwardly of the periphery of reel R. These dimples are spaced to be snap received in the openings 34 of each of the ears when the clip is mounted on the reel. They are sufficiently remote from the peripheries of side walls 10 so that main plate 30 rests on the very peripheral edges of the side walls when the dimples 36 are snap received in openings 34. In this manner the reel clip C releasably grips or holds the reel side walls proximate their peripheries for retaining the clip device in operative engagement with the reel and for resisting movement of the clip device along the peripheries of the reel and its side walls.

The main plate also includes a pair of upstanding flanges 38 at its rearward end. Each is provided with an opening through which a pin or rivet 40 is adapted to pass. Pin or rivet 40 passes through a generaly tubular segment of elongated cover plate 42 retaining cover plate 42 and main plate 30 in operative engagement and for hingedly connecting them to each other. Cover plate 42 is also generally arcuate in longitudinal cross section and is generally complementary in curvature to main plate 30. At its forward end cover plate 42 is upturned to provide a handle segment 44.

Intermediate its ends, cover plate 42 has connected thereto, as by adhesive, a generally rectangular elastic or rubber resilient block 46 which serves as a griping means or retainer block. While such a block has been shown mounted on the inner or confronting surface of cover plate 42, it is contemplated that the block or other gripping means may be mounted on the other or both of the cover and main plates.

To clamp the hingedly connected main and cover plates together so that the end portion E of a continuous tape may be releasably clamped or gripped therebetween, cover plate 42 is provided intermediate its end with a pair of downwardly extending spring tongues 48 having indented segments 50 adapted to underlie the longitudinal edges of main plate 30 thereby to releasably clamp the plates together. It will be appreciated that the indented segments 50 are positioned so that the gripping means, such as block 46, will be urged against the plate surface confronting the plate to which it is connected so that when the end portion E of a continuous tape is located therebetween the tape end E is releasably gripped or clamped thereby.

Main plate 30 adjacent its rearward end defines a tape receiving slot 52 through which the end portion E of the tape may be threaded to present end portion E to the gripping means of this invention. The width of the slot is slightly greater than the tape width to permit ease of threading.

As has been mentioned plates 30 and 42 are but slightly wider than the perpendicular distance between the outer faces of side walls 10. The ears 32 and tongues 48, both of a spring or resilient character, extend substantially closely parallel to those outer faces so that the entire transverse dimension of the reel clip is little more than the perpendicular distance between the outer faces 14, hence but slightly greater than the width of the reel. Where dimples 36 are provided the effective transverse width of reel clip C may even more closely approximate the transverse width of the reel. In this manner, present containers for reels R may still be used to house reels with a reel clip of this invention mounted thereon.

To use the reel clip assembly of this invention, reel clip C may be releasably mounted, as by ears 32 on the peripheral edge of a reel R. The cooperating means on the reel clip and reel resist movement of the clip along the periphery of reel R. The end portion E of the tightly wound tape T is passed or threaded through slot 52 and brought over main plate 30. While threading, the cover plate may be positioned generally as shown in FIG. 2. Once the tape end portion is properly positioned, the cover plate is swung downwardly on the hinging means until the indented segments 50 of locking tongues 48 underlie the edges of main plate 30. At that point the tape end portion E will be firmly gripped between the main plate and the cover plate, the cooperative gripping means thereby preventing or resisting the tendency of the tightly wound courses of tape to unwind.

The foregoing will make it apparent to those skilled in the art that various modifications in the illustrative structure may be made and are within the purview of this invention.

I claim:

1. Means for retaining a plurality of courses of inteligence bearing tape in a tightly wound position within a reel having spaced side walls comprising a reel clip having hingedly connected substantially parallel cover and main plates, a resilient block mounted on one of said cover and main plates and lying therebetween, means on said cover plate for releasably clamping said cover plate to said main plate and for urging said resilient block against the other of said cover and main plates, there being a tape receiving slot defined by said reel clip through which the tape end may be threaded to position it between said main plate and said cover plate, and at least one pair of opposed ear means integral with said main plate and spaced from each other a distance substantially equal to the distance between the outer surfaces of said side walls for releasably clamping the clip device to the side walls of said reel.

2. The means of claim 1 in which the ear means define openings and the outer surfaces of said side walls bear dimples snap receivable in said openings to clamp the clip device to said reel and to restrain movement of said clip device along the peripheries of the side walls of said reel.

References Cited by the Examiner

UNITED STATES PATENTS

| | | | |
|---|---|---|---|
| 564,070 | 7/1896 | Hartmann | 206—54 |
| 648,237 | 4/1900 | Cadaret | 206—55 |
| 1,048,270 | 12/1912 | Aughinbaugh | 242—74.2 |
| 1,761,837 | 6/1930 | McCarthy | 242—74 |
| 1,933,659 | 11/1933 | Curran | 206—53 |
| 2,174,049 | 9/1939 | Werner | 206—53 X |
| 2,272,628 | 2/1942 | Anderson | 206—59 |

FOREIGN PATENTS

| | | |
|---|---|---|
| 180,062 | 5/1922 | Great Britain. |

WILLIAM FELDMAN, *Primary Examiner.*

D. A. GRIFFIN, *Examiner.*